United States Patent [19]

Kitano et al.

[11] Patent Number: 4,741,424
[45] Date of Patent: May 3, 1988

[54] CLUTCH DISC

[75] Inventors: Seiichi Kitano, Nakano; Mitsuhiko Takenaka, Neyagawa, both of Japan

[73] Assignee: Kabushiki Kaisya Daikin Seisakusyo, Osaka, Japan

[21] Appl. No.: 867,046

[22] Filed: May 27, 1986

[30] Foreign Application Priority Data

Jun. 19, 1985 [JP] Japan ................. 60-133788

[51] Int. Cl.⁴ ............................................. F16D 13/60
[52] U.S. Cl. ............................. 192/107 M; 192/70.14; 192/111 A; 188/251 A
[58] Field of Search .......... 192/70.14, 107 R, 107 M, 192/111 A; 188/218 XL, 251 A

[56] References Cited

U.S. PATENT DOCUMENTS

| 1,958,319 | 5/1934 | Stanley | 192/70.14 |
| 2,083,989 | 6/1937 | Eisenhardt | 188/251 A |
| 2,101,410 | 12/1937 | Nutt et al. | 192/107 C |
| 2,554,548 | 5/1959 | Albagnac | 192/107 M |
| 2,986,252 | 5/1961 | Du Bois | 192/107 M |
| 3,068,131 | 12/1962 | Morton | 428/65 |
| 3,255,846 | 6/1966 | Livezey | 188/71.8 |
| 3,797,622 | 3/1974 | Wörner et al. | 192/107 M |
| 3,899,050 | 8/1975 | Savary et al. | 188/73.1 |
| 4,018,311 | 4/1977 | Tickle | 188/218 XL |
| 4,202,432 | 5/1980 | Komori | 192/107 M |
| 4,270,640 | 6/1981 | Davies | 192/70.14 |
| 4,305,494 | 12/1981 | Ishida et al. | 192/107 M |
| 4,562,910 | 1/1986 | Maycock | 192/70.27 |
| 4,615,427 | 10/1986 | Majima | 192/107 M |

FOREIGN PATENT DOCUMENTS

| 678973 | 7/1939 | Fed. Rep. of Germany ... 192/107 M |
| 56-20838 | 2/1981 | Japan ......................... 192/107 R |
| 814992 | 6/1959 | United Kingdom ......... 192/107 C |

Primary Examiner—John E. Murtagh
Assistant Examiner—Andrew J. Rudy
Attorney, Agent, or Firm—Bradford E. Kile

[57] ABSTRACT

A clutch disc equipped with an organic facing for light load and a cerametallic facing for heavy load which are arranged adjacently in a circumferential direction of a driven plate, characterized by that thickness of the cerametallic facing is made larger than that of the organic facing and at the same time a cushion is formed at a part on which the organic facing of said driven plate is lined.

6 Claims, 5 Drawing Sheets

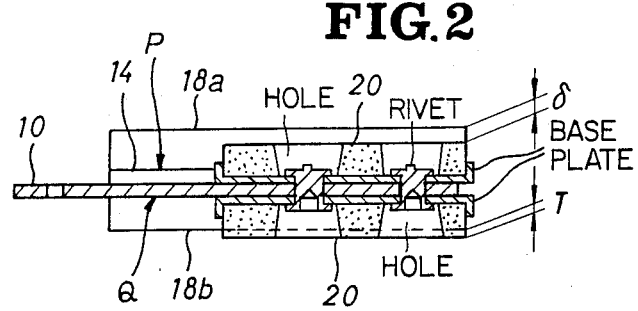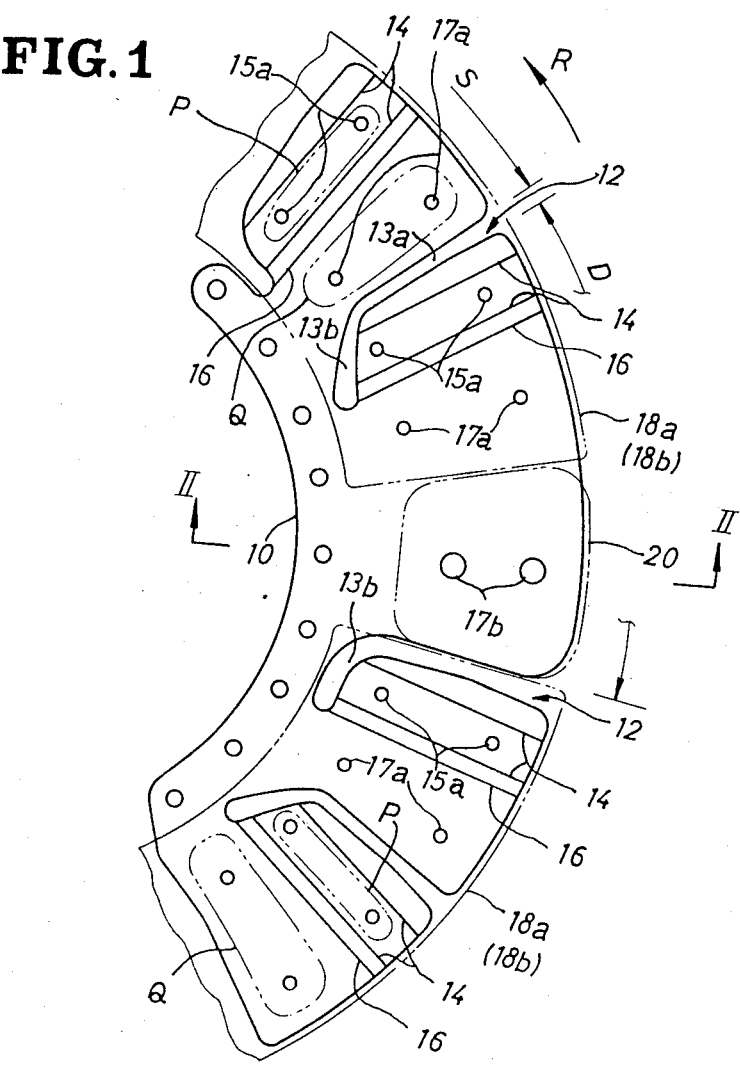

4,741,424

CLUTCH DISC

BACKGROUND OF THE INVENTION

1. Industrial Useful Field

This invention relates to an improvement of a clutch disc equipped with an organic facing for a light load and a cerametallic facing for a heavy load.

2. Prior Art and Its Problem

In a conventional clutch disc of this kind, a disc-like driven plate is lined with an organic facing for a light load and a cerametallic facing for a heavy load.

However, a conventional disc of this kind includes a problem that a so-called initial fade "F" is generated, in which an initial wear of an organic facing synchronizes with that of a cerametallic facing to remarkably decrease a friction coefficient $\mu$ at an initial stage of use of the clutch disc. This may even presents a change of friction coefficient $\mu$ in relation to a durable factor "E".

OBJECT OF THE INVENTION

An object of the present invention is to provide a clutch disc equipped with an organic facing for light loads and a cerametallic facing for heavy loads, characterized by that an initial fade, wherein a friction coefficient is decreased remarkably at an initial stage of use of the clutch disc, can be prevented.

SUMMARY OF THE INVENTION

1. Technical Measure

A clutch disc equipped with an organic facing for a light load and a cerametallic facing for a heavy load is arranged adjacent to and in a circumferential direction with a driven plate. The invention is characterized in that a thickness of the cerametallic facing is made larger than that of an organic facing and at the same time a cushion is formed at a part on which the organic facing of said driven plate is lined.

2. Function

The thickness of the cerametallic facing is made larger than that of the organic facing and at a same time the cushion is formed on which the organic facing of the driven plate is lined, so that an initial face may be avoided because a time lag occurs between an initial wear of the organic facing and an initial wear of the cerametallic facing.

BRIEF DESCRIPTION OF THE DRAWINGS

FIG. 1 is an essential plan view of a portion of a clutch disc in accordance with the present invention.

FIG. 2 is a sectional view taken on a line II—II of FIG. 1.

DETAILED DESCRIPTION OF THE INVENTION

Embodiment

Figure 3:
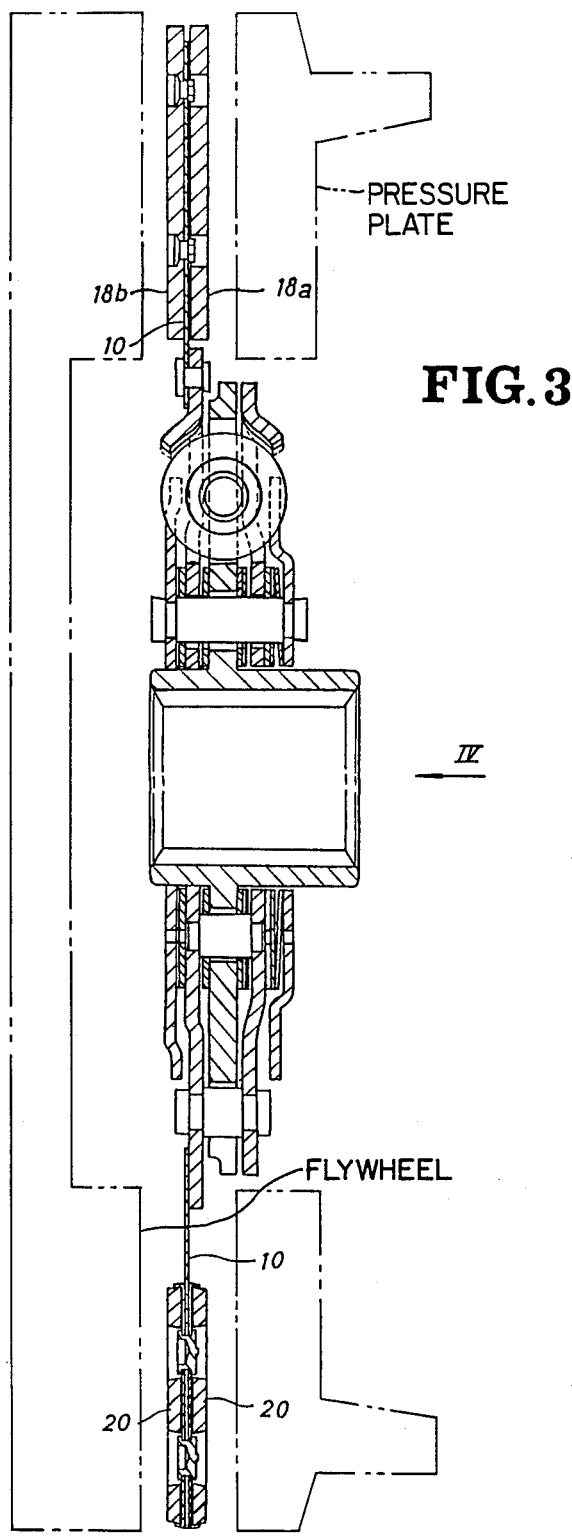
FIG. 3 is a vertical sectional view showing a design example of a clutch disc in accordance with the present invention.

The clutch disc of this invention will be described hereunder with reference to FIG. 1

FIG. 1 discloses a clutch disc from the pressure plate side and 10 is a driven plate. Plural grooves 12 are provided on the drive plate 10 approximately radially from its outer peripheral edge toward its inner periphery. The groove 12 is composed of a radial portion 13a which is directed toward a center of the drive plate 10 and a bent portion 13b which is bent in a direction opposite to an arrow R (the arrow R indicates a rotation direction of the clutch disc). This groove 12 is successively disposed over the entire circumference of the drive plate 10 by combining a narrow space S with a wide space D by turns.

Projected edge lines 14 and a recessed edge line 16 are formed radially on the drive plate 10 at a position radially outside of the bent portion 13b, and a P-part surrounded by the projected edge lines 14 projects toward said pressure plate side to form a cushion. A Q-part adjacent to the recessed edge line 16 is of disc-shape.

Rivet holes 15a are made on the P-part, and an organic facing 18a (for light load) of the pressure plate side is fastened to the rivet holes 15a by means of rivets.

Rivet holes 17a are made on the Q-part, and an organic facing 18b of the flywheel side is samely fastened to the rivet holes 17a by means of rivets.

Rivet holes 17b are made on the driven plate 10 at a left-side of the groove 12 in FIG. 1, and cerametallic facings 20 for heavy load are fastened to the rivet holes 17b by means of rivets from both sides as shown in FIG. 2.

A thickness of the cerametallic facing 20 is made a little larger than the thickness of the organic facing 18b by a fine thickness of T. The fine thickness T is preset to an amount corresponding to an initial wear amount of the cerametallic facing 20. Further, since the organic facing 18a of the pressure plate side is fastened to the P-part, it projects from the cerametallic facing 20 by a projecting amount of $\delta$. Both of the organic facings 18a and 18b are preset to the same thickness.

Figure 4:
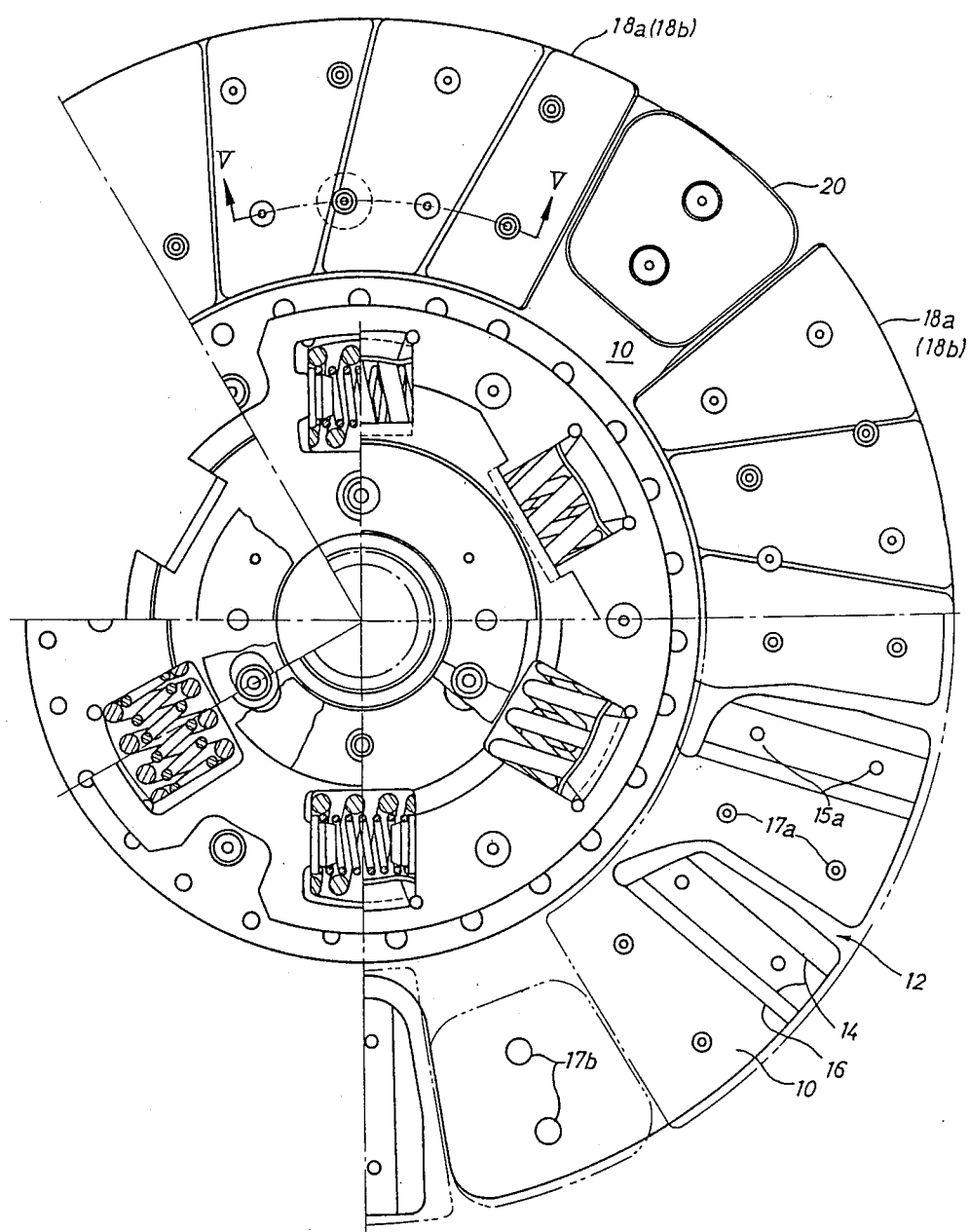
FIG. 4 is a view viewed in the direction of arrow IV of FIG. 3.
Figure 5:
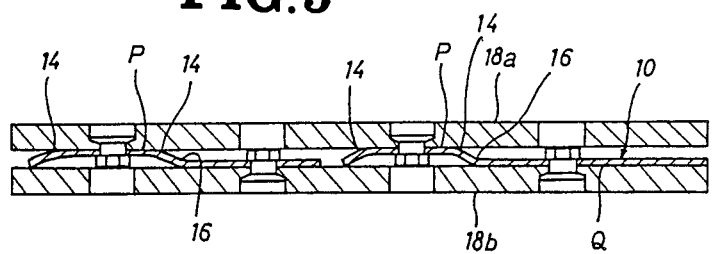
FIG. 5 is a view shown in a direction of arrow V of FIG. 4.
Figure 7:
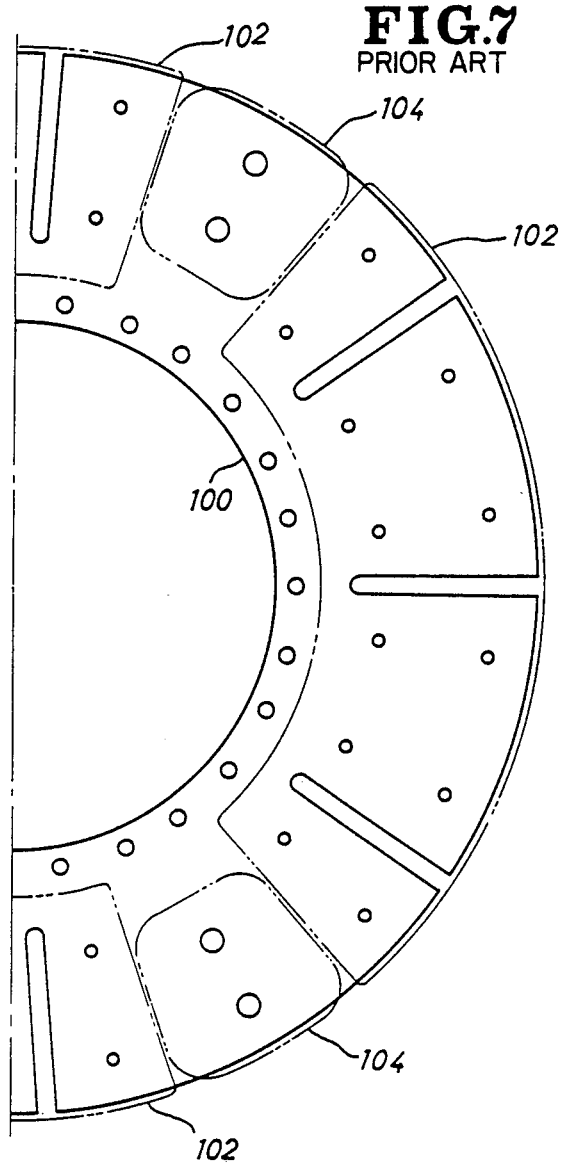
FIG. 7 is a partial plane view of a conventional embodiment.

Practical design examples, as described above, according to the present invention are shown in FIG. 3~FIG. 5. FIG. 4 is a view shown in the direction of arrow IV of FIG. 3. FIG. 5 is a sectional view taken along line V—V of FIG. 4. In FIG. 3~FIG. 5, components attached with the same signs as FIG. 1~FIG. 2 represent the same or equivalent ones.

First, at an initial stage of engagement wherein a clutch disc begins to be pressed on by the pressure plate, a pressure plate presses on the organic facing 18a which is projecting by the projecting amount of $\delta$. Since the P-part is deflected by a pressing force in this instance, a cushion effect of the P-part provides a smooth engagement action even if a violent clutch pedal operation is made at the initial stage of engagement.

When the engagement action progresses, the organic facing 18a becomes flat with the cerametallic facing 20 so that the both cerametallic facings 20 are pressed by the pressure plate and flywheel. Consequently, the pressure plate side the organic facing 18a produces an initial wear earlier than the cerametallic facing 20.

Under this condition, a torque is transmitted by the cerametallic facing 20 suitable for heavy load. The fine thickness T is provided between the flywheel side of the cerametallic facing 20 and the organic facing 18, so that the cerametallic facing 20 first produces an initial wear at an initial stage of use of the clutch disc, then the organic facing 18b, begins to press on the flywheel after completion of the initial wear of the cerametallic facing 20.

Figure 8:
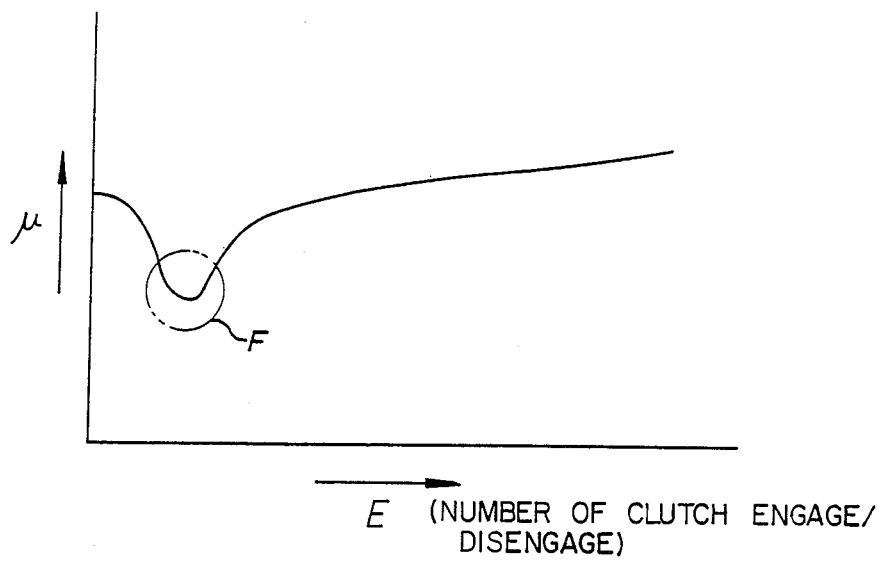
FIG. 8 is a graph showing a fade characteristic of the conventional embodiment.
Figure 6:
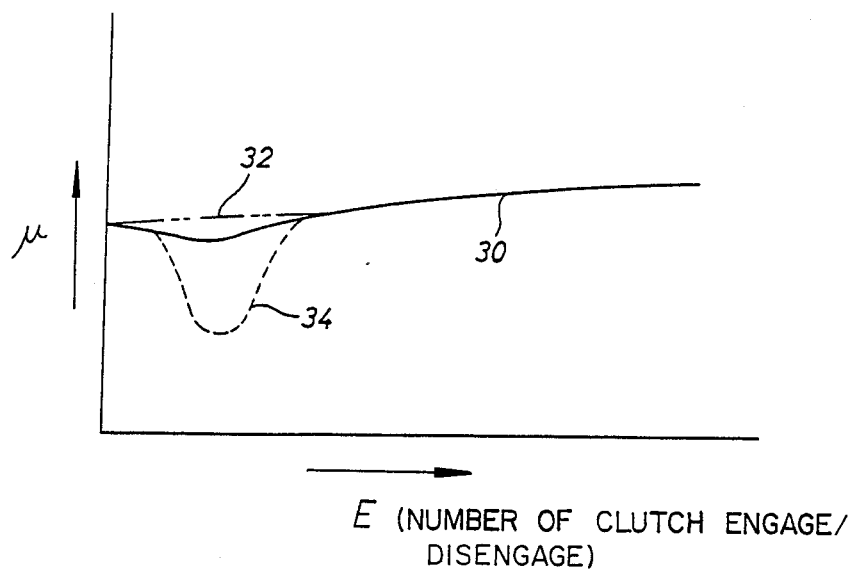
FIG. 6 is a graph showing a fade characteristic of the present invention.

Therefore, a time lag occurs between the initial wear of the cerametallic facing 20 and the initial wear of the organic facing 18b, so that a so-called initial fade is avoided, which is generated by synchronous occurrence of the initial wears of the cerametallic facing 20 and the organic facing 18a. For this reason, a fade characteristic of the clutch disc according to this invention is illustrated as a characteristic 30 developing no initial fade F (FIG. 8) and formed by combining a characteristic 32 of the cerametallic facing 20 with a characteristic 34 of the organic facings 18a and 18b, as shown by FIG. 6 representing a change of friction coefficient $\mu$ in relation to durable frequency E.

Further, since the rivet holes 15a and 17a of rivets for fastening the organic facings 18a and 18b to the driven plate 10 are formed with distances smaller than conventional ones, the number of rivets can be increased so that a shearing force per rivet can be reduced.

Effect of the Invention

As described above, in a clutch disc according to the present invention wherein the organic facings 18a and 18b for a light load and the cerametallic facing 20 for a heavy load are arranged adjacently in the circumferential direction of the driven plate 10; the thickness of the cerametallic facing 20 is made larger than that of the organic facings 18a and 18b and at the same time the cushion composed of the projected edge line 14 and the recessed edge line 16 is formed at the part on which the organic facing 18a of said driven plate 10 is lined. Therefore, the following advantage becomes obtainable.

The organic facing 18a produces the initial wear earlier than the cerametallic facing 20 at the pressure plate side, while the cerametallic facing 20 produces the initial wear earlier than the organic facing 18b at the flywheel side. Consequently, there is no occurrence of synchronous wear of the cerametallic facing 20 and both organic facings 18a and 18b, so that generation of a conventional so-called initial fade F (FIG. 8) can be avoided.

At an initial stage of engagement the pressure plate presses on the organic facing 18a which is projecting by the projecting amount of $\delta$ and the P-part is deflected by the pressing-on force, so that the cushion effect of P-part provides a smooth engagement action even if violent clutch pedal operation is made a an initial stage of engagement.

What is claimed is:

1. A clutch disc equipped with an organic facing for a relatively light load and a cerametallic facing for a relatively heavy load, said clutch disc comprising:
    a driven plate;
    organic clutch facings operably connected to each side of said driven plate and having a first axial thickness;
    cerametallic clutch facings operably connected to each side of said driven plate and having a second axial thickness;
    the axial thickness of said cerametallic facing being greater than the axial thickness of said organic facing on each side of said driven plate; and
    cushion means formed between said driven plate and said organic facings on the side of said driven plate operably adjacent a pressure plate; said cushion means operably extending said organic facings outwardly from said driven plate, an amount greater than the extent of said cerametallic clutch facings such that when said clutch disc is positioned between a flywheel and a pressure plate, the pressure plate initially contacts said organic facings and said cerametallic clutch facing initially contact the flywheel.

2. A clutch disc as set forth in claim 1, in which a thickness of the cerametallic facing is made larger than that of the organic facing by a thickness corresponding to an initial wear amount of the cerametallic facing.

3. A clutch disc as set forth in claim 1, in which the cushion is formed of approximately radial projected- and recessed-edge lines with respect to the driven plate and it projects in a direction of the pressure plate by a specified projecting amount.

4. A clutch disc as set forth in claim 1, in which approximately radial grooves extending from an outer peripheral edge toward an inner periphery of the driven plate are formed on the driven plate at plural places spaced equally in a circumferential direction around the clutch disc.

5. A clutch disc as set forth in claim 4, in which the groove of the driven plate is formed of a radial portion which extends radially from the outer peripheral edge of the driven plate toward a center of the approximately circular-arc-shape driven plate and a bent portion which is connected to said radical portion and bent in a direction opposite to intended rotation of clutch.

6. A clutch disc equipped with an organic facing for a relatively light load having a first axial thickness and a cerametallic facing for a relatively heaving load having a second axial thickness which are arranged in a circumferential direction of a driven plate, characterized in that the axial thickness of the cerametallic facing is made larger than that of the organic facing and a cushion is formed between the organic facing and said driven plate; the axial thickness of the cerametallic facing on a flywheel side of the clutch disc is made larger than that of the organic facing by an axial thickness corresponding to an initial wear amount of the cerametallic facing; the cushion is formed of approximately radial projected and recessed edge lines on the driven plate so that the organic facing projects in a direction of a pressure plate by a specified projecting amount greater than said cerametallic facing toward a pressure plate; approximately radial grooves extend from an outer peripheral edge toward an inner periphery of the driven plate are formed on the driven plate at plural places spaced equally in a circumferential direction of the clutch disc; the groove of the drive plate is formed of a radial portion which extends radially from the outer peripheral edge of the driven plate and a bent portion which is connected to said radial portion and bent in a direction opposite to rotation of a clutch; and said projected edge line and recessed edge line are formed at a radial outside of the bent portion of this groove.

* * * * *